United States Patent [19]

Shikata et al.

[11] Patent Number: 4,730,514

[45] Date of Patent: Mar. 15, 1988

[54] DIFFERENTIAL SPEED LIMITING DEVICE MECHANISM

[75] Inventors: Kiyoshi Shikata, Neyagawa; Bonnosuke Takamiya, Johyoh, both of Japan

[73] Assignees: Mitsubishi Jidosha Kogyo Kabushiki Kaisha, Tokyo; Kabushiki Kaisha Daikin Seisakusho, Osaka, both of Japan

[21] Appl. No.: 853,623

[22] Filed: Apr. 18, 1986

[30] Foreign Application Priority Data

Apr. 22, 1985 [JP] Japan ................................. 60-60040

[51] Int. Cl.$^4$ ............................................. F16H 1/44
[52] U.S. Cl. .................................. 74/711; 192/70.12; 74/467
[58] Field of Search ................ 74/710.5, 711, 467; 192/70.12, 70.2

[56] References Cited

U.S. PATENT DOCUMENTS

| | | | | |
|---|---|---|---|---|
| 2,091,270 | 8/1937 | Colman | ............ | 192/70.12 X |
| 2,808,739 | 10/1957 | Mueller | ............ | 74/711 |
| 3,448,635 | 6/1969 | Nelson | ............ | 74/710.5 |
| 3,748,928 | 7/1973 | Shiber | ............ | 74/711 |
| 4,012,968 | 3/1977 | Kelbel | ............ | 74/711 |
| 4,445,400 | 5/1984 | Sullivan et al. | ............ | 74/711 |

FOREIGN PATENT DOCUMENTS

| | | | |
|---|---|---|---|
| 1256990 | 12/1971 | United Kingdom | ............... 74/710.5 |
| 1394886 | 5/1975 | United Kingdom | ................. 74/711 |

*Primary Examiner*—Dirk Wright
*Attorney, Agent, or Firm*—Robert E. Burns; Emmanuel J. Lobato

[57] ABSTRACT

A differential limiting device is provided for use in a differential mechanism adapted to divide and transmit a torque from an input shaft to two output shafts. The device includes an oil pump driven by the difference in revolution speed between two shafts selected from the input shaft and output shafts, a wet clutch equipped with two types of disks and adapted to connect said selected two shafts to each other by the pressure of a working oil discharged from the oil pump, and an orifice-equipped lubricating passage for jetting out the working oil, which has been discharged from the oil pump, toward the disks of the clutch in order to avoid possible burnout of the disks.

9 Claims, 8 Drawing Figures

DIFFERENTIAL SPEED LIMITING DEVICE MECHANISM

BACKGROUND OF THE INVENTION

(1) Field of the Invention

This invention relates to a differential mechanism for dividing and transmitting each torque from an input shaft to two output shafts, and particularly to a differential limiting device suitable for use in the differential mechanism.

(2) Description of the Prior Art

Differential limiting devices called LSDs (Limited Slip Differentials) have conventionally been proposed. In such an LSD, irrespective of the degree of difference in revolution speed between two output shafts, torques $(Td/2)-\alpha$ and $(Td/2)+\alpha$ are transmitted respectively to the faster and slower output shafts, in which Td means a differential case torque transmitted from an engine and $\alpha$ denotes a constant value inherent to the structure of the LSD.

There have also been proposed Furgason-type differential limiting devices, in each of which silicone oil or the like is filled between each two adjacent disks of a multiplicity of disks rotatable as unitary members with both output shafts and a limiting torque (equivalent to the above-described $\alpha$) is applied in proportion to the difference in revolution speed between both shafts by making use of the fact that the shear force of the silicone oil increases in proportion to the difference in revolution speed between both shafts.

The former differential limiting devices (LSDs) however show their differential limiting function even when smallest differences exist in rotation speed between both shafts. When mounted on cars, they induce problems such as deterioration in driving feeling and steering stability.

On the other hand, the latter differential limiting devices (i.e., of the Furgason type) must employ many disks due to their structures, resulting in an inevitable problem that their structures become voluminous.

In addition, there is a relation between the difference $\Delta N$ in revolution speed between the front and rear wheels and the produced torque T as shown by a letter C' in FIG. 6. Accordingly, a torque rises so abruptly that the tight corner braking phenomenon takes place.

Since a wet clutch has such a structure that a torque is produced by allowing its disks to slide on one another under pressure, there is a possible problem that the disks may be burnt out due to sliding friction when a large difference in revolution speed continues to exist.

SUMMARY OF THE INVENTION

With a view toward overcoming the above-mentioned problems, the present invention has as its object the provision of a differential limiting device suitable for use in a differential mechanism, which while permitting simplification of the structure, can apply a limiting torque in proportion to the difference in revolution speed and at the same time, can improve the torque rising characteristics and perform lubrication of disks.

In one aspect of this invention, there is thus provided a differential limiting device suitable for use in a differential mechanism adapted to receive, via an input shaft, a drive force from a transmission connected to an engine and to distribute the drive force to two output shafts, which comprises:

an oil pump interposed between two shafts selected from the input shaft and output shafts and driven by a difference in revolution speed between said selected two shafts, thereby discharging a working oil at a pressure proportional to the difference in revolution speed;

a wet clutch equipped with two types of plural disks and a working oil compartment and adapted to connect said selected two shafts to each other by the working oil discharged from the oil pump;

passage means for supplying the working oil, which has been discharged from the oil pump, to the working oil compartment of the clutch;

lubricating passage means connected to either the supply passage means or the working oil compartment so as to jet out the working oil, which has been discharged from the oil pump, as a lube oil toward the disks of the clutch; and an orifice provided with the lubricating passage means.

In the above-described differential limiting device of this invention, the occurrence of a difference in revolution speed between both shafts causes the oil pump to produce a discharge pressure in proportion to the difference and the discharge pressure is then supplied to the working oil compartment by way of the passage means. Thereafter, the working oil is fed as a lube oil to the disks of the wet clutch through the lubricating passage means equipped with the orifice.

Since the differential limiting device of this invention permits automatic control of the magnitude of each torque, which is to be transmitted by the wet clutch, in accordance with the above-mentioned difference in revolution speed by using a simple structure, it has brought about such merits that it can exhibit its function fully without deterioration in driving feeling and steering stability and in addition, without need for an extremely large number of clutch disks unlike Furgason-type differential limiting devices and it can hence contribute to the reduction of the size of the overall structure and the manufacturing cost.

The differential limiting device of this invention allows lubrication of the disks in the wet clutch, thereby preventing possible burnout of the disks and improving their durability.

BRIEF DESCRIPTION OF THE DRAWINGS

Certain embodiments of this invention will hereinafter be described with reference to the accompanying drawings, in which.

DETAILED DESCRIPTION OF THE PREFERRED EMBODIMENTS

Figure 1:
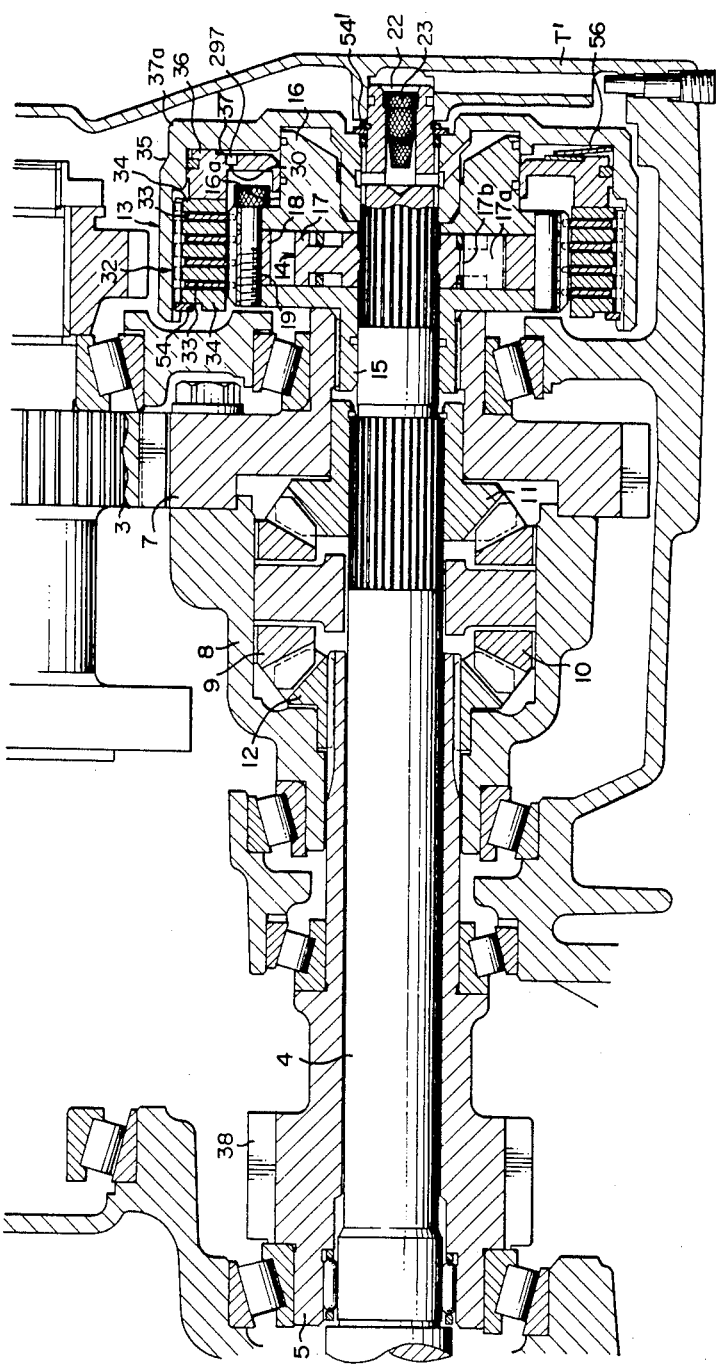
FIG. 1 is a fragmentary cross-sectional view of a differential limiting device according to one embodiment of this invention, which is suited for use in a differential mechanism.
Figure 2:
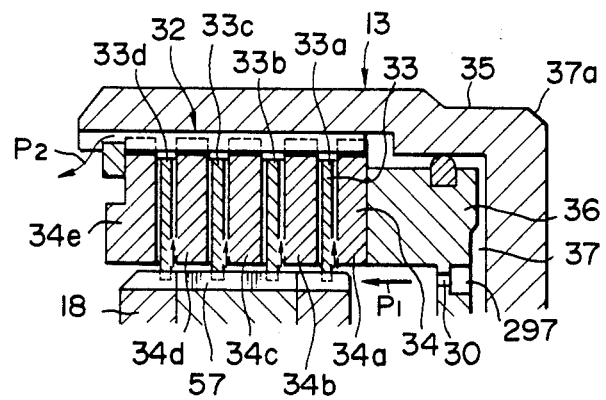
FIG. 2 shows an essential part of the differential limiting device on an enlarged scale.
Figure 3A:
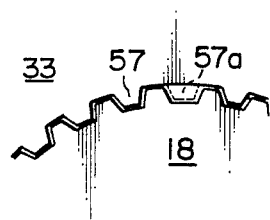
FIGS. 3(a) and 3(b) are schematic front views of spline(keys and keyways)-defining portions of clutch disks, respectively.
Figure 3B:
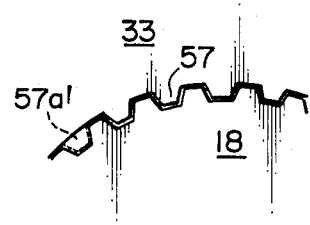
Figure 4:
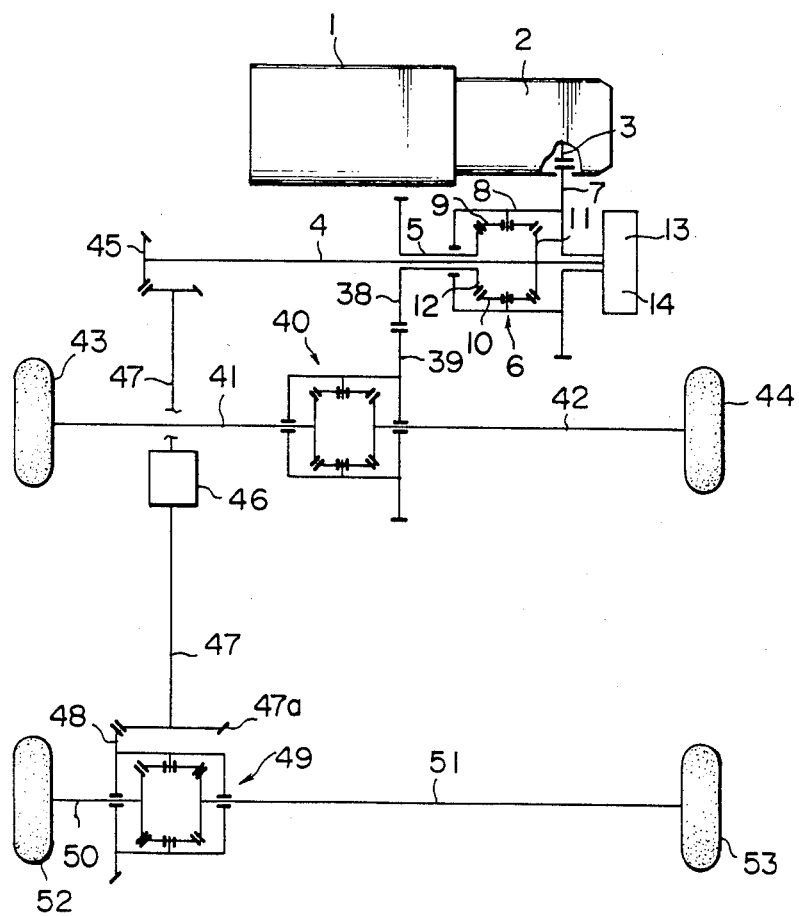
FIG. 4 schematically illustrates the power transmission system of a car with the differential limiting device incorporated therein.

In the first embodiment of this invention, as depicted in FIGS. 1, 2 and 4, a transmission 2 is connected to a transversal engine 1. Maintained in meshing engagement with a drive gear (or 4-speed counter gear) 3 of the transmission 2 is a ring gear 7 of a differential mechanism 6 (hereinafter called "central differential mechanism") which serves to divide a torque from a shaft (input shaft) fixed on the drive gear 3 into equal halves and then to transmit the thus-divided torques respectively to two output shafts 4,5. Here, the one of the output shafts, i.e., the output shaft 4 (hereinafter called "output shaft for the rear wheels") is a drive shaft for the rear wheels while the other output shaft 5 (hereinafter called "output shaft for the front wheels") is a drive shaft for the front wheels.

The ring gear 7 is coupled as a unitary member with a differential case 8, on which pinions 9,10 are provided. The pinions 9,10 are maintained in meshing engagement with side gears 11,12. The output shaft 4 for the rear wheels is connected to the side gear 11 whereas the output shaft 5 for the front wheels is connected to the side gear 12.

In addition, a differential limiting device 13 is interposed between the side of the differential case 8 connected to the input shaft and the output shaft 4 for the rear wheels.

The differential limiting device 13 is composed of a vane pump 14 as an oil pump driven by the difference in revolution speed between the differential case 8 and the output shaft 4 for the rear wheels so as to discharge the working oil at a pressure proportional to the difference in revolution speed and a wet clutch 32 for receiving, via a hydraulic circuit, the discharged working oil from the vane pump 14 so that the degree of connection between the side of the differential case 8 and the output shaft 4 for the rear wheels is controlled to reduce the difference in revolution speed.

The way of arrangement of the oil pump 14 and wet clutch 32 will next be described.

As illustrated in FIG. 1, the outer circumference of a case 15 defines keys and keyways. The ring gear 7, which is fastened to the differential case 8 by means of bolts (only one bolt is shown in the drawing), defines matching keyways and keys at the inner circumference thereof. The case 15 and ring gear 7 are fit together. The vane pump 14 is provided in the case 15.

The vane pump 14 is provided with a rotor 17, the inner circumference of which defines keys and keyways. The output shaft 4 for the rear wheels defines at the outer circumference thereof matching keyways and keys. The keys and keyways of the rotor 17 are fit in and on the keyways and keys of the output shaft 4. The vane pump 14 is also provided with vanes 17a, which are fit in slots 17b of the rotor 17 and biased radially and outwardly, and with a cam ring (casing) 18 maintained in sliding contact with the outer edges of the vanes 17a. The rotor 17, vanes 17a and cam ring 18 are all disposed inside a pump casing 16.

The pump casing 16 is fixed on the case 15 by bolts 19.

Figure 5:
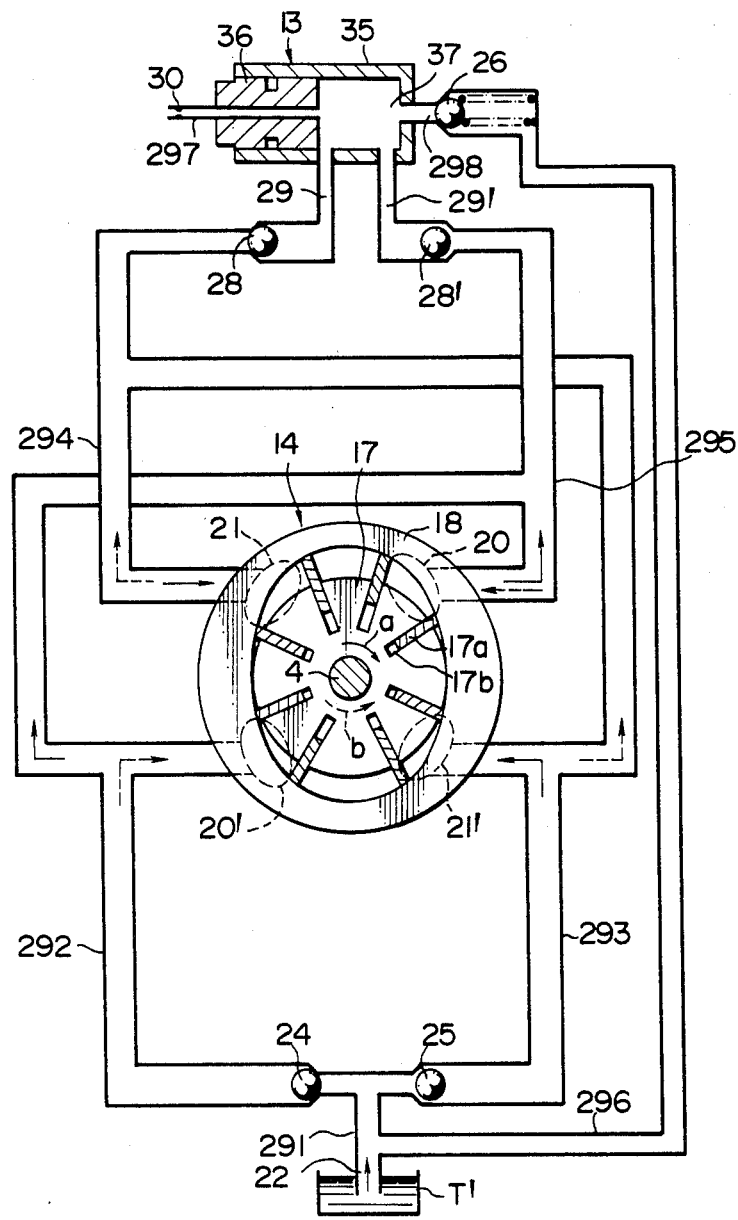
FIG. 5 is a hydraulic circuit of a vane pump employed in the differential limiting device.

Four ports 20,20',21,21' are formed in the vane pump 14 as illustrated in FIG. 5. The ports 20,20' are connected to and are in communication with an oil intake port 22, which opens in the proximal end of the output shaft 4 for the rear wheels and is in communication with an oil pan formed in the bottom of the transmission case T', by way of an oil passage 292, check valve 24 and intake oil passage 291. Furthermore, the ports 20,20' are also connected to and are in communication with a discharge oil passage (passage means) 29' via an oil passage 295 and check valve 28'. The other ports 21,21' are connected to and are in communication with the oil intake port 22 by way of an oil passage 293, a check valve 25 and the intake oil passage 291. Furthermore, the ports 21,21' are also connected to and are in communication with a discharge oil passage (passage means) 29 via an oil passage 294 and check valve 28.

In addition, an oil passage 296 equipped with a relief valve 26 is interposed between the oil passage 291 and a return oil passage 298 which is in communication with a connection-controlling oil compartment 37 of the wet clutch 32.

From the oil compartment 37, a lubricating oil passage (lubricating passage means) 297 including an orifice 30 bored through a piston 36 of the wet clutch 32 is branched out.

When a difference in revolution speed occurs between the output shaft 5 for front wheels and the output shaft 4 for the rear wheels and the rotor 17 rotates in a direction indicated by an arrow a shown in FIG. 5 relative to the cam ring 18, the working oil is drawn through the ports 21,21' by way of the oil intake port 22, oil passage 291, check valve 25 and oil passages 293,294, followed by its discharge through the oil passage 29' by way of the ports 20,20', oil passages 292,295 and check valve 28'. The characteristics of the pressure of the discharged oil are similar to those indicated by a letter A in FIG. 6.

When the rotor 17 turns conversely in a direction indicated by an arrow b shown in FIG. 5 relative to the cam ring 18, the working oil is drawn through the ports 20,20' by way of the oil intake port 22, oil passage 291, check valve 24 and oil passages 292,295, followed by its discharge through the oil passage 29 by way of the ports 21,21', oil passages 293,294 and check valve 28. The characteristics of the pressure of the oil discharged in this matter are also similar to those indicated by the letter A in FIG. 6.

Turning now to the characteristics A, the increase of the discharged pressure is substantially saturated beyond a certain specific value of the difference in revolution speed because the relief valve 26 opens when the discharge pressure reaches a predetermined value.

Before the opening of the relief valve 26, the characteristics A indicate that the discharge pressure is in proportion to the square of the difference in revolution speed owing to the action of the orifice 30.

It is hence possible to control the characteristics A as desired by setting the opening characteristics of the relief valve 26 and the degree of contraction of the orifice 30 suitably.

Incidentally, a part of the oil passage 291 is formed in the output shaft 4 for the real wheels. An oil filter 23 is provided within the oil passage 291 at a position adjacent to the oil intake port 22.

In the outer circumference of the pump case 16, an annular step-like portion 16a is formed as depicted in FIG. 1. The annular piston 36 is fit in this annular step-like portion 16a. Accordingly, the oil compartment 37 is defined between the piston 36 and a cylinder 37a (namely, the outer circumference of the pump case 16 and the inner circumference of a sleeve 35). The oil passages 29,29' shown in FIG. 5 are in communication with the oil compartment 37.

Therefore, the piston 36 is pushed out by the working oil discharged through the oil passages 29,29'.

Adjacent to the piston 36, there is provided the wet clutch 32 which is brought into its connected state when the piston 36 is pushed out in the above manner.

Within the oil compartment 37, an annular spring 56 (an upper portion of which is omitted in FIG. 1) is interposed as biasing means between the inner wall of the cylinder 37a and the piston 36. As indicated by the letter B in FIG. 6, a biasing force (initial limiting torque) is applied to the piston 36 in such a way that the wet clutch 32 is normally in its connected state.

The wet clutch 32 is composed of a plurality of annular clutch disks 33 (four disks 33a–33d in the illustrated embodiment) and a plurality of annular clutch disks 34 (five disks 34a–34e in the illustrated embodiment). The disks 33 define at the inner circumferential edges thereof a plurality of keys and keyways. The cases 15,16 and cam ring 18 serve as a clutch hub and defines a plurality of matching keyways and keys at the outer circumferences thereof. The disks 34 define at the outer circumferential edges thereof a plurality of keys and keyways. The sleeve 35 is attached as a clutch cylinder 37a on the output shaft 4 for the rear wheels and defines at the inner circumference thereof a plurality of matching keyways and keys. The disks 33 and the cases 15,16 and cam ring 18 are fit together, while the disks 34 and sleeve 35 are also fit together. The clutch disks 33,34 are alternately arranged to make up a frictional engagement element.

When the working oil is supplied to the oil compartment 37 and the piston 36 is hence pushed out, the clutch disks 33,34 are caused to contact firmly to each other so that the pump case 15 and sleeve 35 are connected to each other. The output shaft 4 coupled with the sleeve 35 is accordingly connected with the differential case 8 fastened with the pump case 15, whereby the output shafts 4,5 are finally connected to each other. Incidentally, designated at numerals 54,54' in FIG. 1 are snap rings.

The oil passage 297 opens toward the clutch disks 33,34 (where the pressure is substantially the same as the atmospheric pressure) of the wet clutch 32. Therefore, the wet clutch 32 is cooled and lubricated by the oil supplied from the oil passage 297.

Namely, as illustrated in FIG. 2, the orifice 30 is formed through the piston 36. The orifice 30 is radially in registration with cut-off portions 57a formed by partly cutting off some of involute keys 57 which are in turn formed on the inner circumferential edge of the disk 33a.

The lube oil jetted out from the orifice 30 toward the involute keys 57 is allowed to flow axially through the cut-off portions 57a of the disks 33a–33c and at the same time to spread out radially from the inner circumferential edges of the respective disks 33a–33d.

The cut-off portions 57a,57a' have been formed by partly cutting off some of the involute keys 57 formed on the inner circumferential edges of the disks 33a–33d. The cut-off portions 57a of the disks 33a–33c are formed in the same phase, whereas the cut-off portions 57a' of the disk 33d are offset in phase from the cut-off portions 57a of the disks 33a–33c.

The offset may for example be set at 45°. In each of the disks 33a–33d, its cut-off portions 57a or 57a' may be formed, for example, at an angular interval of 90°.

As shown in FIGS. 1 and 4, a gear 38 is provided on the output shaft 5 for the front wheels. The gear 38 is maintained in meshing engagement with a ring gear 39 of a differential mechanism 40 for the front wheels (hereinafter called "front wheel differential mechanism 40"). Each torque from the output shaft 5 is hence divided by the front wheel differential mechanism 40 and transmitted to front wheel axles 41,42 so as to drive the front wheels 43,44.

On the other hand, the output shaft 4 for the rear wheels is connected to a propeller shaft 47 by way of a bevel gear mechanism 45. The propeller shaft 47 rearwardly terminates in a bevel gear 47a which is maintained in meshing engagement with a ring gear 48 of a differential mechanism 49 for the rear wheels (hereinafter called "rear wheel differential mechanism 49"). Owing to this construction, each torque of the output shaft 4 is divided by the rear wheel differential mechanism 49 and then transmitted to the left and right axles 50,51 to drive the rear wheels 52,53.

The reference numeral 46 in FIG. 4 shows a transfer interposed in the propeller shaft 47.

Since the differential limiting device according to the first embodiment of this invention has the above-described construction, the rotor 17 is caused to rotate in the direction indicated by the arrow a relative to the cam ring 18 when the front wheels 43,44 slip and the revolution speed of the output shaft 5 for the front wheels becomes faster than that of the output shaft 4 for the rear wheels in the course of a fourwheeled drive.

Thus, the working oil is drawn through the ports 21,21' by way of the oil intake port 22, oil passage 291, check valve 25 and oil passages 293,294 and is then discharged from the oil passage 29' into the oil compartment 37 via the ports 20,20', oil passages 292,295 and check valve 28'.

Since the pressure of the thus-discharged oil is in proportion to the difference in revolution speed between the output shaft 5 and output shaft 4, the force under which the clutch disks 33,34 are pressed against one another by the piston 36 is also determined by the difference in revolution speed.

As a result, the magnitude of the torque transmitted by the wet clutch 32 varies depending on the difference in revolution speed.

When a difference takes place between the revolution speed of the output shaft 5 and that of the output shaft 4, the wet clutch 32 is thus brought into a connected state in which the the degree of connection is proportional to the difference. Therefore, the difference in revolution speed is reduced and as a result, a torque is also transmitted to the output shaft 4 while suppressing the slipping of the front wheels 43,44. The drive force is thus applied to the vehicle continuously.

Since the magnitude of each torque transmitted by the wet clutch 32 is automatically controlled in accordance with the difference in revolution speed, there is no danger to induce deterioration in driving feeling and/or steering stability.

The piston 36 is normally biased toward the clutch disks 34 (34a) by the annular spring 56 and no clearances are hence left between the clutch disks 33,34 (33a–33d,34a–34e). The clutch disks 33,34 (33a–33d,-34a–34e) are hence pressed as soon as the vane pump 14 discharges the working oil in response to the occurrence of a difference in revolution speed. A hydraulic pressure is accordingly developed promptly subsequent to the occurrence of the difference in revolution speed, thereby instantaneously providing a clutch torque proportional to the difference in revolution speed.

Figure 6:
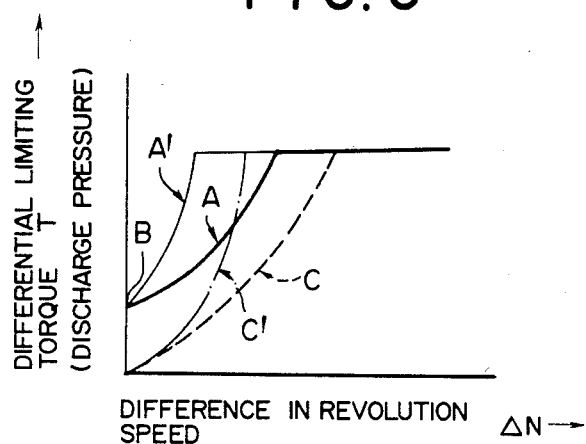
FIG. 6 is a diagram useful in describing the operation of the differential limiting device.

Compared with the characteristics of a conventional differential limiting device equipped with no biasing means, which is indicated by a letter C (C') in FIG. 6, the provision of the annular spring 56 can produce the large initial torque B. In addition, the value of the initial torque B can be set at a desired level by choosing a suitable annular spring as the annular spring 56.

Owing to the provision of the orifice 30, the rising characteristics of the torque has been rendered mild as shown by the letters A,C in FIG. 6, thereby making it possible to eliminate the tight corner braking phenomenon.

It is especially noteworthy that the rising portion of the characteristics A (A') shown in FIG. 6 is in proportion to the square of the difference in revolution speed. Accordingly, the torque does not change too much by smaller differences in revolution speed. This feature has brought about another advantage that the braking phenomenon at low-speed turning or the like can be minimized.

In the above embodiment, the wet clutch 32 has a simple structure of the type that the clutch disks 33,34 are pressed against one another by the piston 36, and the vane rotor pump having the small diameter is used as the vane pump 14. Use of these clutch 32 and vane pump 14 permits the size reduction of the overall structure. The vane pump 14 is arranged radially inside the wet clutch 32 in such a way that the vane pump 14 is received in the axial width of the wet clutch 32. Therefore, the size reduction is facilitated further.

Namely, the vane pump 14 and wet clutch 32 are provided coaxially with the output shafts 4,5 and in mutual alignment in the radial direction of the output shafts 4,5. It is therefore possible to reduce the axial dimension of the differential limiting device.

When the difference in revolution speed exceeds a certain value, the relief valve 26 opens as a safety measure so that the increase of the discharge pressure is suppressed.

When the rear wheels 52,53 rotate faster than the front wheels 43,44 on the contrary, the rotor 17 is automatically caused to rotate in the direction indicated by the arrow b relative to the cam ring 18.

Accordingly, the supply line of the oil is automatically switched over. The working oil is drawn through the ports 20,20' by way of the oil intake port 22, oil passage 291, check valve 24 and oil passages 292,295 and is then discharged from the oil passage 29 into the oil compartment 37 via the ports 21,21', oil passages 293,294 and check valve 28.

Since the pressure of the thus-discharged oil is proportional to the difference in revolution speed, the force under which the clutch disks 33,34 are pressed against one another by the piston 36 is determined in accordance with the difference in revolution speed.

As a result, the magnitude of the torque transmitted by the wet clutch 32 varies depending on the difference in revolution speed.

Since the wet clutch 32 is brought into a connected state in which the degree of connection is proportional to the difference to the revolution speed, the difference in revolution speed is reduced. As a result, a torque is also transmitted to the output shaft 5 for the front wheels. It is therefore possible to drive the front wheels 43,44 while reducing the rotation of the rear wheels 52,53.

Since the magnitude of each torque transmitted by the wet clutch 32 is also automatically controlled in accordance with the difference in revolution speed, there is no danger to induce deterioration in driving feeling and/or steering stability.

When the difference in revolution speed exceeds a certain value, the relief valve 26 also opens as a safety measure so that the increase of the discharge pressure is suppressed.

In the differential limiting device according to the first embodiment of this invention, the product of the transmitted torque and the difference in revolution speed produces heat as an energy loss. The differential limiting device however has another merit that the cooling and lubrication of the wet clutch 32 can be sufficiently performed because a portion of the oil is jetted out through the oil passage 297 toward the clutch disks 33,34 of the wet clutch 32.

Namely, as indicated by an arrow $P_1$ in FIG. 2, the lube oil which has been jetted out from the lubricating oil passage 297 toward the involute keys 57 and keyways of the disks 33a–33d is allowed to flow axially through the cut-off portions 57a of the disks 33a–33c until it reaches the involute keys 57 of the disk 33d.

The lube oil which has been supplied between the disks 33a–33d and the disks 34a–34e respectively is caused to flow radially and outwardly owing to the centrifugal force. During this flow, the lube oil lubricates the surfaces of the disks. Thereafter, the lube oil is discharged in the air in the transmission case T' as indicated by an arrow $P_2$ in FIG. 2.

Incidentally, the lube oil still remaining inside the disk unit is discharged through the cut-off portions 57a' of the disk 33d into the air in the transmission case T'.

The second embodiment of this invention which makes use of a gear (inner-gearing) pump 14' as an oil pump will next be described with reference to FIG. 7. The gear pump 14' is equipped with an inner gear 17' as an external gear and an outer gear 18' as an internal gear. The inner gear 17' defines at the inner circumference thereof keys and keyways. The output shaft 4 for the rear wheels defines at the outer circumference thereof matching keyways and keys. The inner gear 17' and output shaft 4 are fit together. The outer gear 18' is provided at a position eccentric with the inner gear 17'. The inner and outer gears 17',18' are maintained in meshing engagement and are disposed inside the pump case 16.

Incidentally, the pump case 16 is fixed on the case 15 by means of the bolts 19. A crescent 16b, which is a part of the pump case 16, extends in the gap between the inner gear 17' and outer gear 18'.

Figure 7:
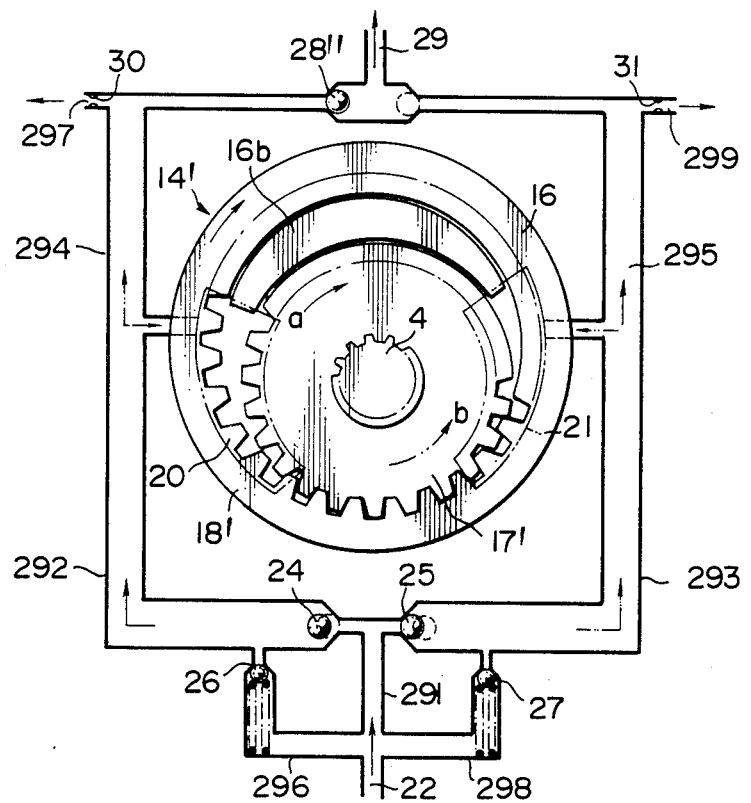
FIG. 7 is a hydraulic circuit of a gear pump employed in a differential limiting device according to the second embodiment of this invention, which is also suited for use in a differential mechanism.

The gear pump 14' defines two ports 20,21 as shown in FIG. 7. One of the ports, i.e., the port 20 is connected to and is in communication with the oil intake port 22, which opens in the proximal end of the output shaft 4 for the rear wheels, by way of the oil passage 292, check valve 24 and intake oil passage 291. The port 20 is also connected to and is in communication with the discharge oil passage 29 by way of the oil passage 294 and a three-way check valve 28". The other port 21 is connected to and is in communication with the oil intake port 22 via the oil passage 293, check valve 25 and intake oil passage 291. The port 21 is also connected to and is in communication with the discharge oil passage 29 by way of the oil passage 295 and the three-way check valve 28".

Further, the oil passage 296 equipped with the relief valve 26 is interposed between the oil passages 291 and 292. Besides, the oil passage 298 equipped with a relief valve 27 is interposed between the oil passages 291 and 293.

The lubricating oil passage 297 equipped with the orifice 30, which opens toward the cut-off portions 57a formed along the inner circumferential edges of the disks 33a–33d, is branched out from the oil passage 294. From the oil passage 295, a lubricating oil passage (lubricating passage means) 299 equipped with an orifice 31 opening toward the cut-off portions 57a is branched out.

Since the differential limiting device according to the second embodiment of this invention, which makes use of the gear pump, is constructed as described above, it can bring about the same advantages as the first embodiment.

In each of the above-described embodiment, the differential limiting device 13 is provided between the ring gear 7 of the central differential mechanism 6 and the output shaft 4 for the rear wheels. It may however be provided between the ring gear 7 of the central differential mechanism 6 and the output shaft 5 for the front wheels. As a further alternative, it may also be provided between the output shaft 4 for the front wheels and the output shaft 5 for the rear wheels. The differential limiting device 13 may also be used in the front wheel differential mechanism 40 or in the rear wheel differential mechanism 49. As means for biasing the vanes 17a against the cam ring 18, various types of springs and their analogous means may be suitably employed.

Having now fully described the invention, it will be apparent to one of ordinary skill in the art that many changes and modifications can be made thereto without departing from the spirit or scope of the invention as set forth herein.

What is claimed is:

1. A differential speed limiting device in a differential mechanism adapted to receive, via an input shaft, a drive force from a transmission connected to an engine and to distribute the drive force to two output shafts, comprising:
    an oil pump interposed between two shafts selected from the input shaft and output shafts and driven by a difference in revolution speed between said selected two shafts, thereby discharging a working oil in an amount proportional to the difference in revolution speed;
    a wet clutch equipped with two types of plural disks and a working oil compartment and adapted to connect said selected two shafts to each other by the discharge pressure generated by an orifice; said orifice restricts the amount of said working oil from said oil pump to generate a discharge pressure and to jet lubricating oil to said clutch discs;
    passage means which supplies the working oil, discharged from the oil pump, to the working oil compartment of the clutch; and
    lubricating passage means with one end in communication with said passage means, and the other end opening near said disks of said clutch;
    said orifice being provided with the opening end, or near the opening end, of the lubricating passage means.

2. A differential speed limiting device in a differential mechanism as claimed in claim 1, wherein the two types of the plural disks are annular and arranged alternately side by side in layers, one type of the disks defines key and keyways at the inner or outer circumferential edges thereof, the keys and keyways of said one type of the disks are fit in and on matching keyways and keys formed on the side of one of said selected two shafts, and the lube oil is jetted out from the lubricating passage means toward the keys and keyways of the disks.

3. A differential speed limiting device in a differential mechanism as claimed in claim 2, wherein some of the keys on inner peripheries of the disks are partly cut off to define cut-off portions through which lube oil may pass.

4. In combination with a differential mechanism having an input shaft and two output shafts,
    a differential speed limiting device comprising a wet clutch comprising coaxial inner and outer clutch members coupled respectively with said two output shafts of said differential mechanism, said outer clutch member having axially extending keyways on an inner periphery thereof and said inner clutch member having axially extending keyways on an outer periphery thereof and a plurality of annular clutch disks between said clutch members and comprising clutch disks having keys on an inner periphery engaging keyways of said inner clutch member alternating with clutch disks having keys on an outer periphery engaging keyways of said outer clutch member, whereby said clutch disks are movable axially relative to said clutch members,
    means for applying pressure to press said clutch disks together, said pressure applying means comprising a cylinder and a piston defining a chamber in said cylinder, said piston being disposed to apply pressure to said clutch disks,
    means for supplying oil under pressure to said chamber to thereby apply pressure to said clutch disks, said pressure oil supplying means comprising pump means having an output proportional to a difference in speed of said two output shafts of said differential mechanism, and
    said piston having therein a calibrated orifice opening from said chamber to said clutch disks to modify the oil pressure in said chamber and to lubricate and cool said clutch disks.

5. A differential speed limiting device according to claim 4, further comprising means for resiliently maintaining said clutch disks in contact with one another when oil pressure in said chamber is relieved.

6. A differential speed limiting device according to claim 4, in which said wet clutch is annular with a central space radially inwardly of said clutch disks and in which said pump means is disposed in said central space.

7. A differential speed limiting device according to claim 6, in which said pump means comprises a cam ring coupled with one of said output shafts of said differential mechanism, a rotor in said cam ring and coupled with the other of said output shafts of said differential mechanism, said rotor having a plurality of radial slots therein, and vanes slidable radially in said slots.

8. A differential speed limiting device according to claim 6, in which said pump means comprises an outer gear which is an internal gear and is coupled with one of said output shafts of said differential mechanism and an inner gear which is an external gear meshing with said outer gear and is coupled with the other of said output shafts of said differential mechanism.

9. A differential speed limiting device according to claim 4, in which circumferentially spaced inner portions of said clutch disks are cut away to provide axially extending oil passages between said clutch disks and said inner clutch member and in which said orifice is positioned to discharge oil into said oil passages whereby oil discharged through said orifice flows axially in said passages and then flows radially outwardly by centrifugal force.

* * * * *